2 Sheets—Sheet 2.

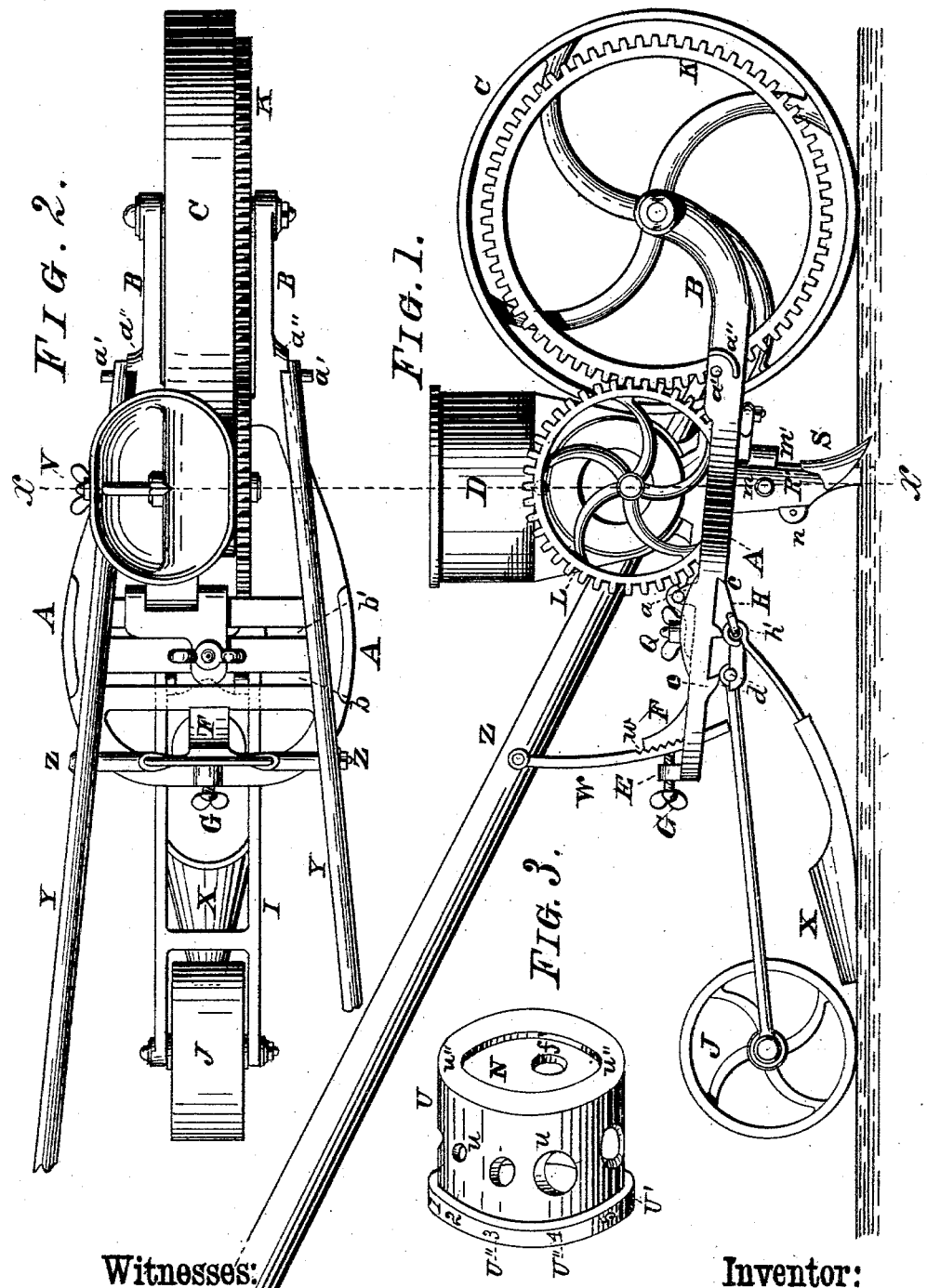

E. RUHLMANN.
Seed-Drill.

No. 210,881. Patented Dec. 17, 1878.

Witnesses:
Frank Hirsch
Chas. Brosart

Inventor:
Eugene Ruhlmann
by Michael P. Stark
atty.

UNITED STATES PATENT OFFICE.

EUGENE RUHLMANN, OF LOCKPORT, NEW YORK.

IMPROVEMENT IN SEED-DRILLS.

Specification forming part of Letters Patent No. 210,881, dated December 17, 1878; application filed December 28, 1877.

*To all whom it may concern:*

Be it known that I, EUGENE RUHLMANN, of the city of Lockport, county of Niagara, State of New York, have invented a new and useful Improvement in Seed-Drills, which improvement is fully set forth in the following specification, reference being had to the following and accompanying drawings.

This invention relates, in general, to seed-drills; and it consists in the peculiar arrangement of parts and details of construction, as hereinafter first fully set forth and described, and then pointed out in the claims.

In the accompanying sheet of drawings, which form a part of this specification, and serve to illustrate my said invention more fully—

Figure 4:
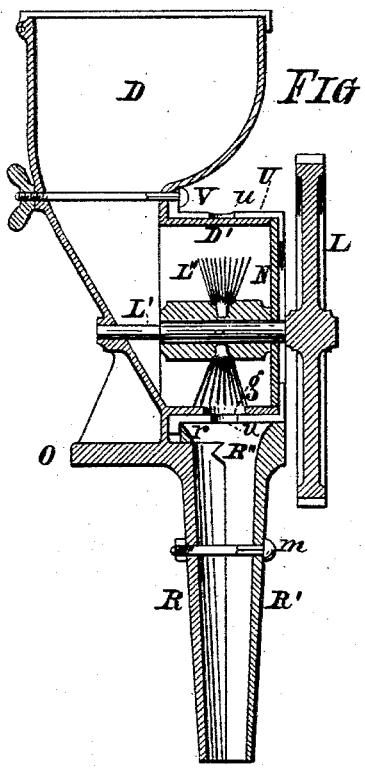
Figure 5:
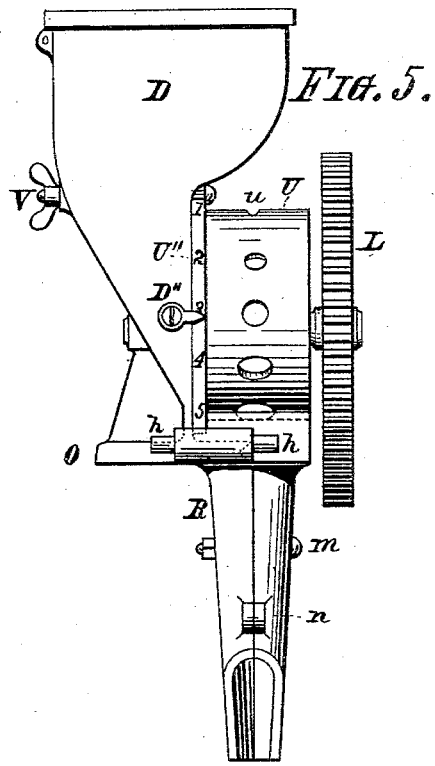
Figure 6:
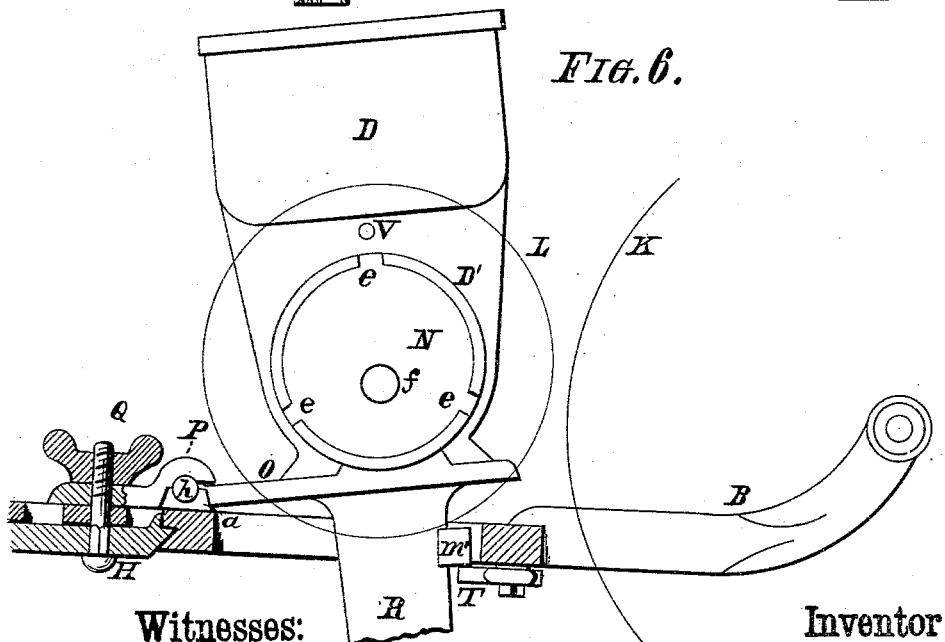

Figure 1 is a side elevation, and Fig. 2 a plan, of my machine complete. Fig. 3 is a perspective view of the seed-gaging cylinder. Fig. 4 is a longitudinal sectional elevation in line $x\ x$, Figs. 1 and 2, of the seed-box and appurtenances. Fig. 5 is an elevation of the same. Fig. 6 is a sectional elevation of said seed-box and a portion of the platform.

Like letters of reference indicate corresponding parts in all the various figures.

A is the bed-plate or platform for my machine. It consists of a pear-shaped skeleton having its front end bifurcated at B to form bearing-arms for the wheel C. Upon this bed-plate are placed two projections, $a$, Fig. 1, serving as lower bearings for a pivoted seed-box, D. It has, furthermore, two transverse slots, $b\ b'$, and on its rear end two projections, E F, respectively, the former serving as a lug for the set-screw G, and the latter as a means for fastening the handles Y in a manner hereinafter more fully referred to. On the under side of this bed-plate are provided two projections, $c\ c$, forming dovetailed guides for the hinge-plate H, Figs. 1 and 6, within which the fork I, carrying the ground wheel or roller J, is pivoted at $d$. To the wheel C is attached, or formed in one piece with it, a spur-wheel, K, engaging with a smaller wheel, L, of the seed-box D, said wheel L being attached to or formed in one piece with the spindle L'.

The seed-box D consists of an oblong receptacle flattened and contracted on one side, and provided with a protuberating annulus, D', the forward end of which is open and notched in its edge to receive lugs $e$ on the head-plate N, which plate is loosely inserted into the end of the protuberation D', and has an aperture, $f$, for the passage of the before-mentioned shaft L'. The projecting ring D' has, furthermore, an aperture, $g$, in its lowest part, serving as a passage for the seed from the seed-box D.

The lower part of the seed-box has a flange, O, which rests upon the bed-plate A, said flange being provided with pivots $h$, resting in the projections $a$ upon said bed-plate, and the said box is held in position by the plate P, secured to the bed-plate A by the bolt and thumb-nut Q. Below the flange O is cast onto the seed-box one half of the dropping-tube R, the other half being a separate piece, secured to the former by the bolt $m$, a steady-pin in the lug $n$ and the V-shaped projection R'' entering a similar groove in the flange O of said seed-box. To the front of the tube R is attached the shovel S, and above that is provided a lug, $m'$, wherewith engages the stop T.

Upon the protuberating part D' is placed the seed-gage U, (illustrated separately in Fig. 3.) This gage consists of a ring having on its rear edge a projection, U', on the periphery of which are placed a series of indications, U''', registering with a series of differently-sized apertures, $u$, in the periphery of said gage-ring. This seed-gage is placed loosely over the exterior of the protuberation D', and held there in diametrically-opposite places by the bolt and thumb-nut V, and the projecting part $r$ of the flange on the half R' of the delivery-spout R.

On the outside of the hopper D is placed a pointer, D'', which, by the indications U''', registers that one of the apertures $u$ opposite the aperture $g$ in the protuberation D'. By turning the thumb-nut V in the proper direction, the said seed-gage is set free to be revolved until the desired aperture $u$ registers with the aperture $g$, when, by tightening said nut, the gage is securely held in position.

Within the protuberating ring D' is placed, upon the spindle L', a brush, L'', which, when revolved by the wheels K L, will sweep the seed into the aperture $g$, from whence it will drop through the gage-aperture $u$ and spout R into the furrow made by the plow S.

The hinge-plate H, carrying the fork I, has two ears, $h'$, within which are hooked the ends of the ground-coverer X. This coverer consists of a convexo-concave plate decreasing in concavity toward the rear end. This coverer slides over the ground behind the dropping-tube R and covers the furrow made by the plow S, while the roller J, following said coverer, compresses the ground. Both coverer and ground-wheel are hinged to the bed-plate A, and can therefore adapt themselves automatically to any undulations of the ground, or any variation in the position of the handles Y.

The handles, by means of which the machine is operated, are pivoted in front to the platform A upon the pins $a'$ $a'$ within guards $a''$ $a''$, and connected together by a bolt, Z, near their middle part, and by a fixed brace-rod, $Z'$, near their rear end. They are arranged with capability of adjustment as to their height by means of the plate W, hinged upon the bolt Z. This brace W has notches $w$ on its lower extremity engaging with similar notches in the projection F. The set-screw G, when withdrawn sufficiently, allows the brace W to disengage from the lug F, when the handles Y may be raised or lowered at will, and when properly adjusted, and the set-screw G tightens, hold said handles rigidly to the platform A.

It will be observed that the bolt Z and the fixed brace $Z'$ hold the handles Y together and upon the pins $a'$. By removing the nut on said bolt Z the handles can be pulled sufficiently apart on their lower end to remove them from said pivots $a'$. To relieve these pivots from all strain whatever, the said platform A has circular guards $a''$, which fit notches on the lower end of said handles, and against which said handles abut, so that the force exerted upon the handles to push the machine ahead is transferred upon said abutments $a''$, the pins $a'$ thus serving simply as pivots around which the handles may turn.

As heretofore described, the spout R is provided with the lug $m'$. This lug serves as a lock for the seed-box D, in conjunction with a lever, T, bolted on the under side of the platform A. The position of this lug is such that when the seed-box rests upon the platform the lever T can be slid over the top surface of the said lug $m'$, and thus hold said seed-box firmly to the platform, while its height is such that when the seed-box rests upon the lever T the gear-wheels K L are disengaged, as illustrated in Fig. 6. By this arrangement I am enabled to connect and disconnect the seed-drill at a moment's time.

Having thus fully described my invention, I claim as new and desire to secure to me by Letters Patent of the United States—

1. In a walking-planter, the combination, with the bed-plate A, of the wheel C, provided with the gear-wheel K, the seed-box D, pivoted to said bed-plate and provided with the protuberating ring $D'$ and gage-ring U, the revolving brush $L''$, driven by the gear-wheels L and K, spout R, and plow S, attached to said spout, the whole constructed and arranged substantially as and for the purpose specified.

2. The seed-box D, having the protuberating ring $D'$, in combination with the seed-gage U, consisting of the perforated ring sliding over the protuberation $D'$, as specified, said gage being rendered attachable to the seed-box by the bolt V and the projection $v$, acting upon the flange $U''$ on said seed-gage, as and for the object stated.

3. The combination, with the seed-box D, having the protuberation $D'$, provided with the aperture $g$, of the seed-gage U, provided with a series of differently-sized apertures, $u$, the plate N, with the lugs $e$ and aperture $f$, spindle $L'$, brush $L''$, and the gear-wheel L, as described.

4. The combination, with the seed-box D, having the protuberation $D'$, provided with notches in its edge, of the plate N, having the aperture $f$, serving as a bearing for the shaft $L'$, said plate being held in place by the lugs $e$ and the inwardly-projecting flange $u''$ on the seed-gage U, as and for the purpose specified.

5. The combination, with the seed-box D, formed with one-half of the dropping-spout R in one piece, of the part $R'$, secured to said part R by the bolt $m$, the steady-pin in the lug $n$ and the V-shaped projection $R''$ on said part $R'$ fitting a correspondingly-shaped groove in the flange O of the seed-box, as described.

6. The combination, with the platform A, having the pivots $a'$ $a'$ and guards $a''$ $a''$, of the handles Y, loosely placed upon said pivots and bearing against the circular guards $a''$, as and for the purpose specified.

7. The combination, with the frame A, having centrally the bolt Q, of the plate H, secured to the under side of the frame by said bolt, and provided with ears $h'$ for attachment of the coverer X, and having the bearing for the pivots $d$ of the fork I, as and for the object specified.

8. A seed-box consisting of the hopper D, having the protuberating ring $D'$, flange O, with the pivots $h$, and one-half of the dropping-spout R cast in one piece, as and for the purpose specified.

9. In a walking-planter, a seed-box having the flange O, provided with the pivots $h$, and the dropping-spout R, furnished with a lug, $m$, in combination with the platform A and lever T, said lever being pivoted to the under side of the platform and arranged to engage the lug $m$ either on the top or bottom side thereof, as and for the object stated.

In testimony that I claim the foregoing as my invention I have hereto set my hand in the presence of two subscribing witnesses.

EUGENE RUHLMANN.

Witnesses:
ANDREW SCHWORM,
ARBOGAST RUHLMANN.